United States Patent
Kadosumi et al.

[11] Patent Number: 5,870,620
[45] Date of Patent: Feb. 9, 1999

[54] DATA DRIVEN TYPE INFORMATION PROCESSOR WITH REDUCED INSTRUCTION EXECUTION REQUIREMENTS

[75] Inventors: Ryuji Kadosumi, Yaita; Tsuyoshi Muramatsu, Nara, both of Japan

[73] Assignee: Sharp Kabushiki Kaisha, Osaka, Japan

[21] Appl. No.: 655,460

[22] Filed: May 30, 1996

[30] Foreign Application Priority Data

Jun. 1, 1995 [JP] Japan .................................. 7-135117

[51] Int. Cl.$^6$ .................................................. G06F 15/00
[52] U.S. Cl. ..................................... 395/800.26; 395/377
[58] Field of Search .................. 395/800.01, 800.25, 395/800.26, 800.27, 728, 185.01, 377

[56] References Cited

U.S. PATENT DOCUMENTS

| | | | |
|---|---|---|---|
| 5,093,919 | 3/1992 | Yoshida et al. | 395/800.25 |
| 5,404,539 | 4/1995 | Onozaki | 395/728 |
| 5,428,812 | 6/1995 | Yoshida | 395/800.25 |
| 5,448,745 | 9/1995 | Okamoto | 395/800.25 |
| 5,528,755 | 6/1996 | Beardsley et al. | 395/185.01 |
| 5,561,804 | 10/1996 | Kanekura | 395/800.25 |

FOREIGN PATENT DOCUMENTS 5-174167 7/1993 Japan .

*Primary Examiner*—Larry D. Donaghue

[57] ABSTRACT

A data driven type information processor includes a firing control unit, an operation unit, and a program storage unit. The firing control unit sequentially receives data packets, and detects a data packet which stores paired data, and outputs the detected data packet. The operation unit receives a data packet output from the firing control unit, operates on the contents of the received data packet, stores the operation result in the received data packet, and outputs the received data packet. The program storage unit receives the data packet output from the operation unit, and reads a program word formed of a plurality of program word sets from a prestored data flow program by addressing based on the contents of the received data packet. Then, the program storage unit outputs no data packet if every Valid flag corresponding to each program word set in the read program word is invalid (data packet erasing), or generates a data packet corresponding to each of at least one program word set whose Valid flag is valid in the read program word, additionally stores data of the operation result in each generated data packet, and outputs each generated data packet (data packet copy). Consequently, data packet erasing or data packet copy by one addressing can be carried out on reading a program in the program storage unit.

18 Claims, 18 Drawing Sheets

FIG. 3
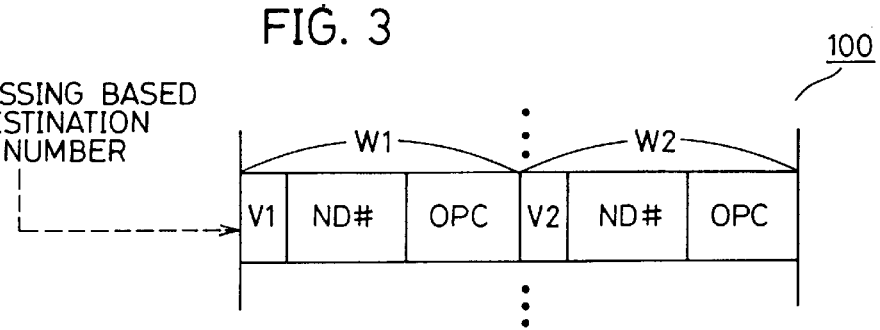
ADDRESSING BASED ON DESTINATION NODE NUMBER
FIG. 4
|  | (V1, V2) | | | |
|---|---|---|---|---|
|  | (0,0) | (0,1) | (1,0) | (1,1) |
| W1 | × | × | ○ | ○ |
| W2 | × | ○ | × | ○ |
|  | ERASE | OUTPUT W2 | OUTPUT W1 | PACKET COPY (OUTPUT BOTH) |
FIG. 5
(a) PRESENT EMBODIMENT
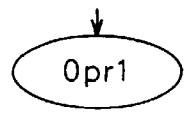
(b) CONVENTIONAL
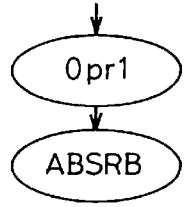

| TF flg | (V1, V2) | | | |
|---|---|---|---|---|
| | (0,0) | (0,1) | (1,0) | (1,1) |
| 0 | X | F | X | F |
| 1 | X | X | T | T |

X : PACKET ERASING
F : SELECT AND OUTPUT W2 (FALSE NODE)
T : SELECT AND OUTPUT W1 (TRUE NODE)

(a) PRESENT EMBODIMENT (b) CONVENTIONAL

FIG. 12

| (T flg, F flg) | (V1, V2) | | | |
|---|---|---|---|---|
| | (0,0) | (0,1) | (1,0) | (1,1) |
| (0, 0) | × | × | × | × |
| (0, 1) | × | F | × | F |
| (1, 0) | × | × | T | T |
| (1, 1) | × | F | T | ○ |

× : PACKET ERASING

○ : PACKET COPY
    (OUTPUT BOTH TRUE
    AND FALSE NODES)

F : SELECT AND OUTPUT W2
    (FALSE NODE)

T : SELECT AND OUTPUT W1
    (TRUE NODE)

FIG. 14
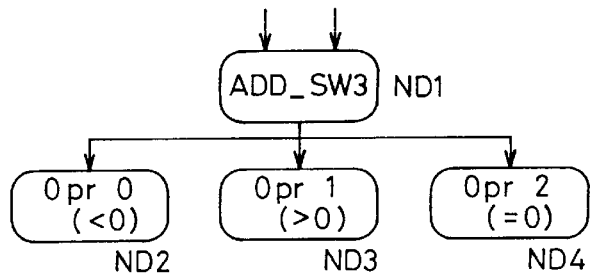
FIG. 15
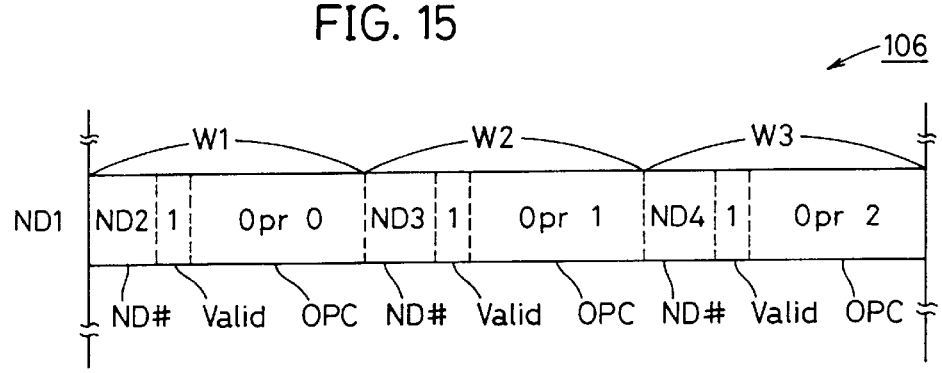
FIG. 16
| OPERATION RESULT | A flg | B flg | C flg |
|---|---|---|---|
| < 0 | 1 | 0 | 0 |
| > 0 | 0 | 1 | 0 |
| = 0 | 0 | 0 | 1 |
FIG. 17
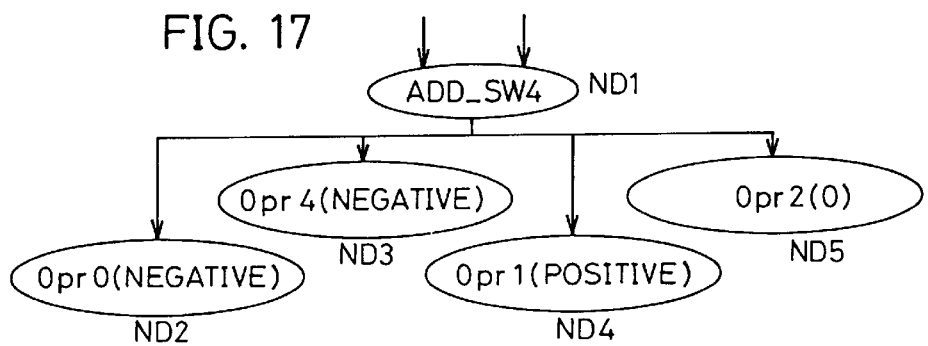

PE(#0),PE(#1): DATA DRIVEN TYPE PROCESSOR

FIG. 32  PRIOR ART
| RESULT OF ND1 | LEFT INPUT DATA : RIGHT INPUT DATA OF ND4 | | RESULT OF ND4 |
|---|---|---|---|
| | (RESULT OF ND2) | (RESULT OF ND3) | |
| < 0 | 0 | 0 | 0 |
| = 0 | 1 | 1 | 2 |
| > 0 | 0 | 1 | 1 |
FIG. 33
PRIOR ART
(a)
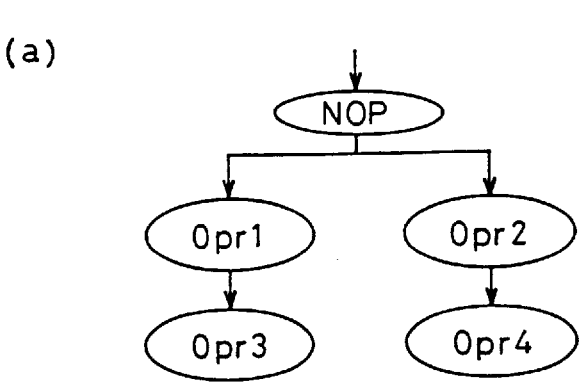
(b)
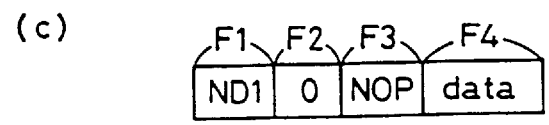
(c)
| F1 | F2 | F3 | F4 |
|---|---|---|---|
| ND1 | 0 | NOP | data |

DATA DRIVEN TYPE INFORMATION PROCESSOR WITH REDUCED INSTRUCTION EXECUTION REQUIREMENTS

BACKGROUND OF THE INVENTION

1. Field of the Invention

The present invention relates to a data driven type information processor, and more particularly, to a data driven type information processor having an improved function to read program data and an improved program execution efficiency.

2. Description of the Background Art

Parallel processing is employed in order to realize high speed information processing. Data driven type architecture has particularly attracted attention among parallel processing architecture.

In a data driven type processor, processing proceeds according to a rule "when all the data needed for a processing are available, and resources such as an operation apparatus required for the processing are assigned thereto, the processing is carried out".

FIG. 26 is a block diagram showing a conventional data driven type processor.

FIG. 27 is a diagram showing a format of a data packet applied to the conventional data driven type processor and embodiments of the present invention.

Referring to FIG. 27, the data packet includes a destination node number field F1 for storing a destination node number ND#, a generation number field F2 for storing a generation number GN#, an operation code field F3 for storing an operation code OPC, and a data field F4 for storing data DATA.

Referring to FIG. 26, a data driven type processor Pe includes a junction unit JNC, a firing control unit FC, an operation unit FPP, a program storage unit PSP, a branch unit BRN, a plurality of latch units, and a plurality of C(Cn) elements (packet transfer circuits).

FIG. 28 is a block diagram showing the program storage unit PSP. The program storage unit PSP having its input stage provided with a latch unit includes a program memory 200, an address generation and access unit 201, and a copy decision unit 202.

FIG. 29 is a diagram partially showing the contents of program memory 200 shown in FIG. 28.

A data flow program consisting of a plurality of program word sets Ws is prestored in program memory 200. Each program word set W is constituted by a subsequent node number ND#, a subsequent operation code OPC, and a copy flag cpy.

Each of the C elements shown in FIG. 26 controls data packet transfer of a corresponding processing unit by transmitting and receiving a data packet transfer pulse to and from C elements in the previous stage and in the subsequent stages thereof.

The data packet transfer pulse consists of signals of two kinds, that is, a SEND signal SD and a ACK (ACKnowledge) signal AK. The SEND signal SD is transferred from a C element in the previous stage of each C element to a C element in the subsequent stage thereof. Fall of the SEND signal SD indicates that a processing unit in the previous stage is ready to transfer a data packet.

The ACK signal AK is transferred from a C element in the subsequent stage of each C element to a C element in the previous stage thereof. The ACK signal AK at a "1" level indicates that a processing unit in the subsequent stage is ready to receive a data packet.

Accordingly, these two signals retained at a "1" level indicate that there is no data packet.

Each latch unit, in response to reception of a pulse from a corresponding C element, introduces and holds data received from a processing unit in the previous stage thereof, carries the data to an output stage thereof, and holds the data until the next pulse is received.

Referring to FIG. 26, when the processor Pe receives a data packet of FIG. 27, the received data packet is first applied through junction unit JNC to firing control unit FC. Firing control unit FC receives the data packet, and forms paired data of different data packets having the same destination node number ND# and the same generation number GN# if an operation code OPC of the received data packet is a prescribed operation code. More specifically, firing control unit FC detects two different data packets having the same node number ND# and the same generation number GN#, additionally stores data DATA of one data packet out of these two data packets having the same node number and the same generation number in a data field F4 of the other data packet, and outputs the other data packet. On the other hand, when the operation code of the received data packet is not the prescribed operation code, the received data packet is output directly.

The data packet output from firing control unit FC is then applied to operation unit FPP.

Operation unit FPP receives an applied data packet, decodes an operation code OPC of the received data packet, performs a prescribed operation of the contents of the received data packet based on the result of decoding, and stores the operation result in a data field F4 of the received data packet. The received data packet is then applied to program storage unit PSP.

Program storage unit PSP receives an applied data packet, and fetches the subsequent program data from program memory 200.

In this fetch of program data, when program storage unit PSP receives a data packet, address generation and access unit 201 generates an address adr from a destination node number ND# of the received data packet, and reads a program word set W from program memory 200 by addressing based on the address adr, as shown in FIG. 28. Then, a destination node number ND# and an operation code OPC in the read program word set W are stored in a destination node number field F1 and an operation code field F3 of the received data packet, respectively.

At this time, if a copy flag cpy corresponding to the read program word set W is "1", the subsequent address is concluded to be valid, so that a destination node number ND# and an operation code OPC of the subsequent address is stored similarly in the received data packet by addressing based on the subsequent address.

Accordingly, when a copy flag cpy is "1", two data packets for respective program word sets Ws of an address corresponding to the copy flag cpy and the subsequent address are generated and output (which is called "packet copy"). When a copy flag cpy is "0", only one data packet for an address corresponding to the copy flag cpy is output.

In packet copy, copy decision unit 202 makes a decision about a read copy flag cpy, and sends a copy request signal CR (=1) to a corresponding Cn element.

The Cn element which has received a copy request signal CR outputs a pulse for the first data packet transfer to a corresponding latch unit, and then outputs a Next Enable signal NE to address generation and access unit 201.

Then, after an appropriate time period, the Cn element outputs a pulse for the next data packet transfer to a corresponding latch unit, so that data accessed with an address incremented by one by address generating and access unit 201 in response to the Next Enable signal NE, that is, a program word set W stored in the subsequent address is latched and another data packet is transferred.

A data packet output from program storage unit PSP is applied to branch unit BRN, and the applied data packet is output from branch unit BRN or is returned to the processor based on a destination node number ND# thereof.

When branch processing such as selection of one of a plurality of instructions is performed in a data driven type processor Pe as described above, such an operation code SWN as disclosed in Japanese Patent Laying-Open No. 5-174167 is used. If this operation code SWN is used, a destination node number ND# of a received data packet is manipulated in operation unit FPP, whereby addressing based on a resultant destination node number ND# is carried out at the time of accessing program memory 200 in program storage unit PSP in the subsequent stage, and therefore, one of a plurality of program word sets W can be accessed selectively.

FIG. 30 is a conventional flow graph including a selection structure using a operation code SWN.

FIG. 31 is a diagram showing the contents of program memory 200 for the flow graph shown in FIG. 30.

FIG. 32 is a table obtained in the course of processing executed according to the flow graph shown in FIG. 30.

The flow graph shown in FIG. 30 includes nodes n1–n8 to which respective operation codes are assigned. An operation code ADD indicates that the result of adding right input data and left input data to a node to which the operation code is assigned is to be output. An operation code EQ indicates that 1 is to be output if left input data=right input data (=0, in the case of FIG. 30) to a node to which the operation code is assigned, and 0 is to be output if the left input data≠the right input data. An operation code GE indicates that 1 is to be output if left input data≧right input data to a node to which the operation code is assigned, and 0 is to be output if the left input data<the right input data. An operation code SWN indicates that left input data to a node to which the operation code is assigned is added to a destination node number ND# of right input data thereto, and output is branched according to a resultant destination node number ND#.

The flow graph of FIG. 30 shows a processing in which an operation code Opr0 of node n6 is selected if the result of addition performed according to an operation code ADD of node n1 is smaller than 0, an operation code Opr1 of node n7 is selected if the addition result is larger than 0, and an operation code Opr2 of node n8 is selected if the addition result is equal to 0.

Since the operation of junction unit JNC, firing control unit FC and branch unit BRN at the time of executing a program according to the flow graph of FIG. 30 is the same as that described above, description thereof will not be repeated, and the operation of operation unit FPP and program storage unit PSP will now be described.

When operation unit FPP receives a data packet which stores a destination node number ND1 and an operation code ADD of node n1, paired data (right input data and left input data to node n1) in a data field F4 of the received data packet are added in operation unit FPP, the resultant value is stored in the data field F4 of the received data packet, and the received data packet is transferred to program storage unit PSP.

Thereafter, program storage unit PSP receives the transmitted data packet, and fetches the subsequent destination node number ND2 and the subsequent operation code EQ by addressing based on a destination node number ND1 of the received data packet, as shown in FIG. 31. At this time, since a corresponding fetched copy flag cpy=1, the subsequent address is valid and the subsequent destination node number ND3 and the subsequent operation code GE are fetched. Furthermore, since a corresponding copy flag cpy=1, the subsequent operation node number ND5 and the subsequent operation code SWN are fetched. Thus, three data packets each of which stores the fetched subsequent data and the addition result are applied to nodes n2, n3, and n5, respectively.

In node n2, output data is 1 if the addition result in an applied data packet=0 and an output data is 0 if the addition result≠0.

In node n3, output data is 0 if the addition result in an applied data packet<0, and output data is 1 if the addition result≧0.

Thus, the relationship between the addition result in node n1 and left input data and right input data to node n4, as well as a result (output data) obtained in node n4 are such as shown in FIG. 32.

Referring to FIG. 32, in node n5, an offset of 1 is added to a destination address of left input data if the result of node n1 is positive, an offset of 2 is added thereto if 0, and an offset of 0 is added thereto if negative.

Thus, in the case of a data packet having a code SWN and a node number ND5 as an operation code OPC and a destination node number ND#, an offset of right data (a resultant value of node n4) is added to the node number ND5 in operation unit FPP, and therefore, access to memory 200 is performed in program storage unit PSP using the resultant node number ND#. As described above, according to this document, branch processing in which any one of nodes n6–n8 is selected with a single instruction of an operation code SWN is performed.

Although packet copy according to a copy flag cpy is carried out in the course of a program in the above description, processing is performed as follows in the case where the packet copy is carried out at the beginning of the program.

FIG. 33 is a diagram illustrating conventional procedure of processing in the case where packet copy is carried out at the beginning of a program.

As described above, packet copy according to a copy flag cpy is performed in program storage unit PSP. Therefore, if packet copy is carried out at the beginning of a program, an operation code NOP (an instruction indicating that a data packet which stores the operation code is caused to pass through a processor without operation) is assigned in the first node of the flow graph as shown in (a) of FIG. 33, the contents shown in (b) of FIG. 33 are stored in program memory 200, a data packet shown in (c) of FIG. 33 is first applied to processor Pe, an NOP instruction is executed by means of the applied data packet, whereby the applied data packet is caused to pass through processor Pe and then is applied again to processor Pe.

In the above described conventional method of controlling execution of a program including a selection structure, operation nodes of multi-stages are required to produce a selection control signal, as shown. in FIG. 30. Therefore, the number of instructions to be executed increases, resulting in difficulty in improving execution efficiency of a data flow program.

In addition, if processing such as packet copy at the beginning of a program is carried out, an NOP instruction is conventionally executed by means of a data packet and the data packet must be made to pass through a processor, so that circulating data packets are generated excessively, resulting in difficulty in improving program execution efficiency.

SUMMARY OF THE INVENTION

It is an object of the present invention to provide a data driven type information processor capable of carrying out a program efficiently.

In order to achieve this object, the data driven type information processor in accordance with the present invention is provided with a processing unit including at least one information processing unit having a data pair generation unit, an operation unit and a program storage unit, and a data supply unit located in an input stage of the processing unit.

The data pair generation unit receives a data packet including at least a destination field for storing destination information, an instruction field for storing instruction information and a data field for storing data; outputs the received data packet directly if instruction information in the instruction field of the received data packet is not prescribed instruction information; and additionally stores the contents in the data field of one data packet out of two different data packets having the same destination information in respective destination fields in a data field of the other data packet and outputs the other data packet if the instruction information is prescribed information.

The operation unit receives a data packet output from the data pair generation unit, performs prescribed operation of the contents in a data field of the received data packet according to instruction information in an instruction field of the received data packet, stores the operation result in the data field of the received data packet, and outputs the received data packet.

The program storage unit receives a data packet from the operation unit; reads at least one subsequent destination information and at least one subsequent instruction information from a prestored first data flow program by first addressing based on the contents of a destination field of the received data packet; generates at least one data packet which stores the read destination information and the read instruction information in a destination field and an instruction field thereof, respectively, and which also stores the contents of a data field of the received data packet in a data field thereof; and outputs the generated data packet.

The data supply unit receives a second data packet having at least a destination field and a data field; reads at least one subsequent destination information and at least one subsequent instruction information from a prestored second data flow program by second addressing based on the contents of the destination field of the received second data packet; and generates at least one data packet which stores the read destination information and the read instruction information in a destination field and an instruction field thereof, respectively, and which also stores the contents of the data field of the received second data packet in a data field thereof to supply the generated data packet to the processing unit, or erases the received second data packet.

According to the above described data driven type information processor, the second data flow program is supplied in the form of a data packet from the data supply unit to the processing unit, the step for the first data flow program in each information processing unit is reduced as much, so that the number of instructions to be executed is also reduced, resulting in improvement in program execution efficiency.

The above described data driven type information processor may be constituted so that the second data flow program consists of at least one second information set including at least the subsequent destination information and the subsequent instruction information in the same program word, and so that the data supply unit reads a program word from the second data flow program by second addressing, generates at least one data packet corresponding to at least one second information set selected from the read program word according to a second prescribed condition, stores the subsequent destination information and the subsequent instruction information of the corresponding second information set in a destination field and an instruction field of each generated data packet, respectively, as well as stores the contents of a data field of the received second data packet in a data field of each generated data packet, and supplies each generated data packet to the processing unit.

Thus, reduction in the number of instructions to be executed can be easily adjusted by setting of the second prescribed condition.

The above described data driven type information processor may be constituted so that the second information set further includes second valid/invalid information indicating whether corresponding subsequent destination information and corresponding subsequent instruction information are valid or invalid, and so that the above described second prescribed condition is a condition for selecting only a second information set in which second valid/invalid information is valid from a program word read by second addressing.

Thus, a plurality of data packets are supplied, that is, data packet copy is carried out when a plurality of second valid/invalid information read by second addressing are valid, and no data packet is supplied, that is, data packet erasing is carried out when all the read second valid/invalid information are invalid, and therefore, the number of instruction to be executed in each information processing unit is reduced as much, resulting in improvement in program execution efficiency.

The above described data driven type information processor may be constituted so that the data supply unit further receives a branch code for branch processing at the time of receiving the second data packet, and so that the second prescribed condition is a condition for selecting only a predetermined second information set which corresponds to a value of the branch code in a program word read by second addressing and in which corresponding second valid/invalid information is valid.

Thus, selective supply of a second data flow program can be realized in addition to data packet copy and data packet erasing as described above, whereby the number of instructions to be executed in each information processing unit is reduced as much.

The above described data driven type information processor may be constituted so that the branch code is formed of at least one flag, and so that the number of flags corresponds to that of second information sets in a program word read by second addressing.

Thus, a second data flow program (a second information set) can be selected and designated by means of setting of each flag. Consequently, processing of a selection structure can be performed when a program is read in the data supply unit, whereby the number of instructions to be executed in each information processing unit is reduced as much.

The above described data driven type information processor may be constituted so that the first data flow program is formed of at least one first information set including at least the subsequent destination information and the subsequent instruction information in the same program word, and so that the program storage unit reads a program word from the first data flow program by first addressing, generates at least one data packet corresponding to at least one first information set selected from the read program word according to a first prescribed condition, stores the subsequent destination information and the subsequent instruction information of the corresponding first information set in a destination field and an instruction field of each generated data packet, respectively, as well as stores the contents of a data field of a received data packet in a data field of each generated data packet, and outputs each generated data packet, or erases the received data packet.

Thus, reading of each first data flow program (each first information set) can be controlled arbitrarily by setting of the first prescribed condition, whereby reduction in the number of instructions to be executed in each information processing unit can be controlled arbitrarily by means of the first prescribed condition.

The above described data driven type information processor may be constituted so that the first information set further includes first valid/invalid information indicating whether corresponding subsequent destination information and corresponding subsequent instruction information are valid or invalid, and so that the first prescribed condition is a condition for selecting only a first information set in which first valid/invalid information is valid from a program word read by first addressing.

Thus, data packet copy is carried out by one addressing if a plurality of first valid/invalid information read by first addressing are set to be valid, and data packet erasing is carried out upon reading a program data if all the read first valid/invalid information are set to be invalid, whereby the number of instructions to be executed in each information processing unit is reduced as much.

The above described data driven type information processor may be constituted so that the operation unit outputs a condition code indicating the result of prescribed operation processing to the program storage unit when it outputs a data packet which stores the result of the prescribed operation processing, and so that the first prescribed condition is a condition for selecting only a predetermined first information set which corresponds to a value of the condition code in a program word read by first addressing and in which corresponding first valid/invalid information is valid.

Thus, selective reading of the first data flow program can be carried out in addition to data packet copy and data packet erasing as described above, whereby the number of instructions to be executed in each information processing unit is reduced as much.

The above described data driven type information processor may be constituted so that the condition code is formed of at least one flag, and so that the number of flags corresponds to that of the first information sets in a program word read by first addressing.

Thus, a first data flow program (a first information set) to be read can be selectively designated by means of setting of each flag. Consequently, processing of a selection structure can be performed upon reading a program in the program storage unit, whereby the number of instructions to be executed in each information processing unit is reduced as much.

In order to achieve the objects described above, a data driven type information processor in accordance with another aspect of the present invention includes a data pair generation unit, an operation unit, and a program storage unit.

The data pair generation unit receives a data packet including at least a destination field for storing destination information, an instruction field for storing instruction information and a data field for storing data, outputs the received data packet directly if instruction information in the instruction filed of the received data packet is not prescribed instruction information; and additionally stores the contents of a data field of one data packet out of two different data packets having the same destination information in respective destination fields in a data field of the other data packet if the instruction information is prescribed instruction information and then outputs the other data packet.

The operation unit receives a data packet output from the data pair generation unit, performs prescribed operation of the contents of a data field of the received data packet according to instruction information of an instruction field of the received data packet, stores the result of the operation in the data field of the received data packet, and outputs the received data packet.

The program storage unit stores a data flow program formed of at least one information set which includes in the same program word the subsequent destination information, the subsequent instruction information, and valid/invalid information indicating whether each of these two subsequent information is valid or invalid. The program storage unit receives a data packet output from the operation unit, reads a program word from the data flow program by addressing based on the contents of a destination field of the received data packet. The program storage unit does not output a data packet if all the valid/invalid information in the read program word are invalid. In addition, the program storage unit generates at least one data packet corresponding to at least one information set in which valid/invalid information in the read program word is valid, stores the subsequent destination information and the subsequent instruction information of the corresponding information set in a destination field and an instruction field of each generated data packet, respectively, as well as stores the contents of a data field of the received data packet in a data field of each generated data packet, and then, outputs each generated data packet.

Thus, if all the valid/invalid information in an addressed program word are set to be invalid, no data packet will be output, that is, data packet erasing will be carried out. On the other hand, if a plurality of valid/invalid information in the addressed program word are set to be valid, a plurality of data packets will be output, that is, data packet copy will be performed. Consequently, data packet erasing and data packet copy by one addressing can be realized upon reading a data flow program in the program storage unit, whereby the number of instructions to be executed in the information processor is reduced, resulting in improvement in program execution efficiency.

The data driven type information processor in accordance with the above described another aspect of the present invention may be constituted so that the operation unit outputs a condition code indicating the result of prescribed operation to the program storage unit when it outputs a data packet which stores the result of the prescribed operation, and so that the program storage unit receives this condition code and generates a data packet only for a predetermined information set which corresponds to a value of the received condition code in a program word read by addressing and in which valid/invalid information is valid.

Thus, data packet copy, data packet erasing, and program data selection according to an operation result can be performed upon reading a program data in the program storage unit, whereby the number of instruction to be executed in the information processor is reduced as much, resulting in improvement in program execution efficiency.

The data driven type information processor in accordance with the above mentioned another aspect of the present invention may be constituted so that the condition code is formed of at least one flag, and so that the number of flags corresponds to that of information sets in a program word read by addressing.

Thus, a data flow program (an information set) to be read can be selectively designated by means of setting of each flag. Consequently, processing of a selection structure can be carried out upon reading the program in the program storage unit, whereby the number of instructions to be executed in the information processor is reduced as much.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only and wherein:

FIG. 3 is a diagram partially showing the contents of a program memory 100 of FIG. 2.

FIG. 4 is a table illustrating fetch operation of the program storage unit PS1 of FIG. 1.

FIG. 5 is a diagram showing comparison between flow graphs of the first embodiment of the present invention and a conventional example for packet erasing.

FIG. 12 is a table illustrating fetch operation of the program storage unit PS3 of FIG. 11.

FIG. 14 is a flow graph of branch processing according to the result of operation using a processor PE4 of FIG. 3.

FIG. 15 is a diagram showing the contents of a program memory 106 of FIG. 13 for the flow graph of FIG. 14.

FIG. 16 is a table illustrating correspondence between the result of operation according to an operation code ADD_SW3 and flag output.

FIG. 17 is a flow graph including packet copy in branch processing in accordance with the third embodiment of the present invention.

FIG. 32 is a table obtained in the course of processing carried out according to the flow graph of FIG. 30.

FIG. 33 is a diagram illustrating conventional procedure of processing in the case where packet copy is carried out at the beginning of a program.

DESCRIPTION OF THE PREFERRED EMBODIMENTS

First to fourth embodiments of the present invention will now be described in detail in conjunction with the accompany drawings.

First Embodiment

In the present embodiment, a data driven type processor which allows, with a single operation code, operation in an operation unit and data packet erasing at the time of fetch of program data in a program storage unit is shown.

Figure 1:
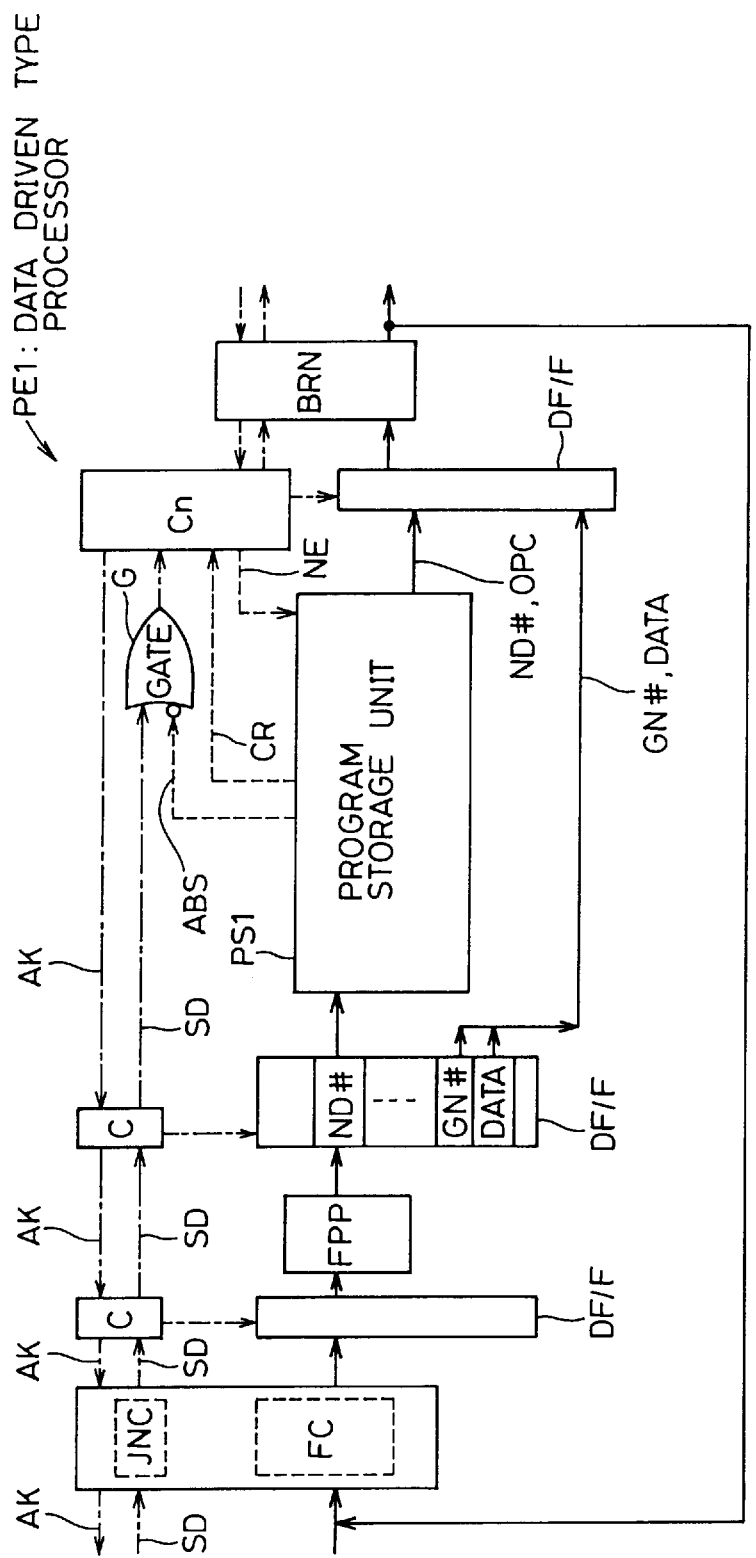
FIG. 1 is a block diagram showing a data driven type processor in accordance with a first embodiment of the present invention.

FIG. 1 is a block diagram showing a data driven type processor in accordance with the first embodiment of the present invention.

Figure 26:
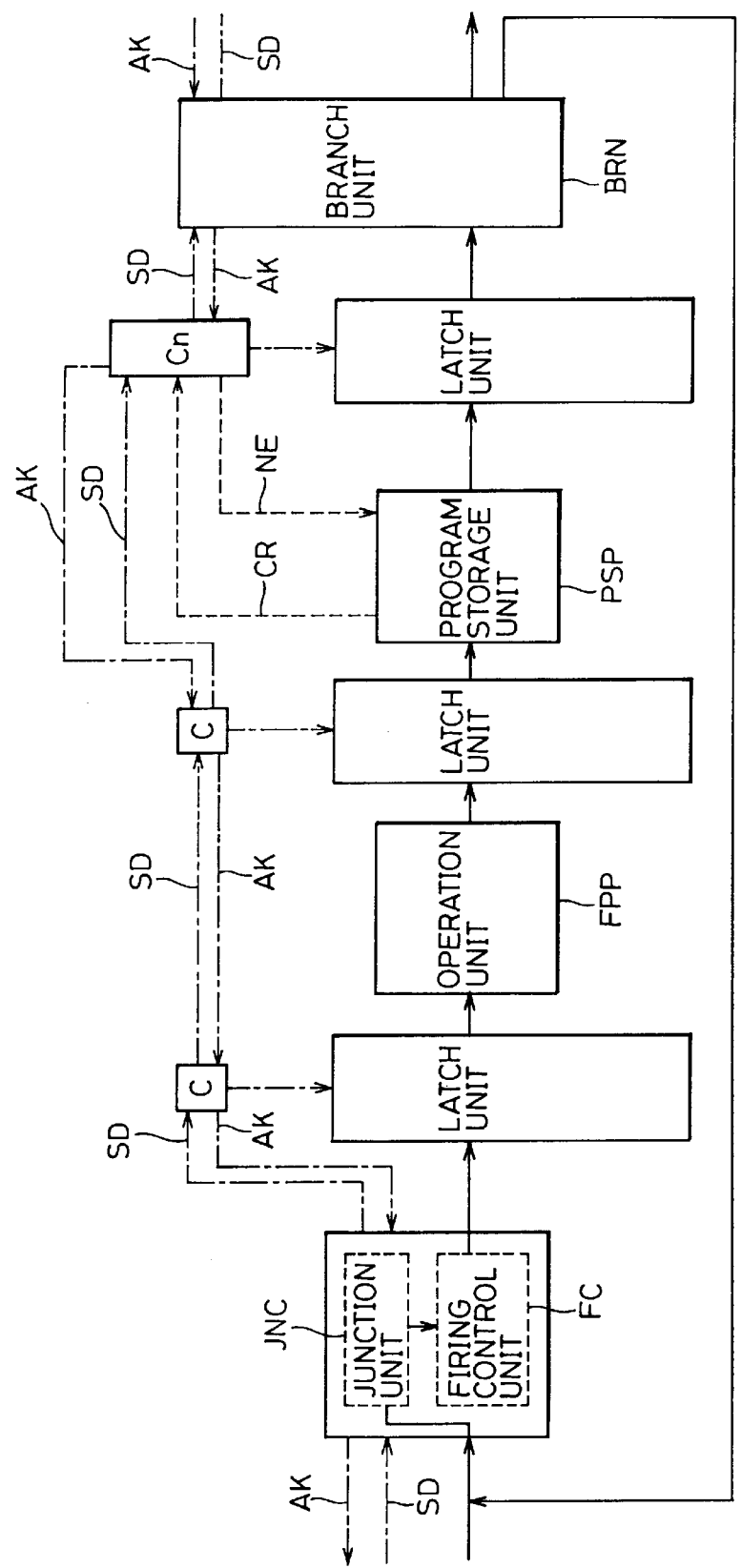
FIG. 26 is a block diagram showing a conventional data driven type processor.

Instead of a program storage unit PSP and a latch unit of a conventional processor Pe shown in FIG. 26, a processor PE1 of FIG. 1 has a program storage unit PS1 and a D type flipflop DF/F which functions similarly to the latch unit. Processor PE1 additionally includes a gate G. Since the structure of processor PE1 is the same as that of processor Pe shown in FIG. 26 otherwise, description thereof will not be repeated.

Figure 27:
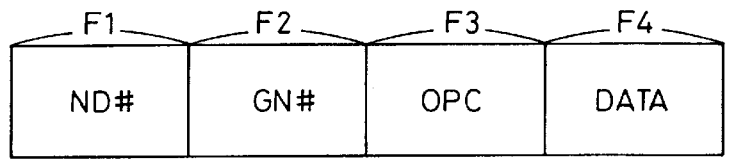
FIG. 27 is a diagram showing format of a data packet which is applied to both a conventional example and embodiments of the present invention.
Figure 28:
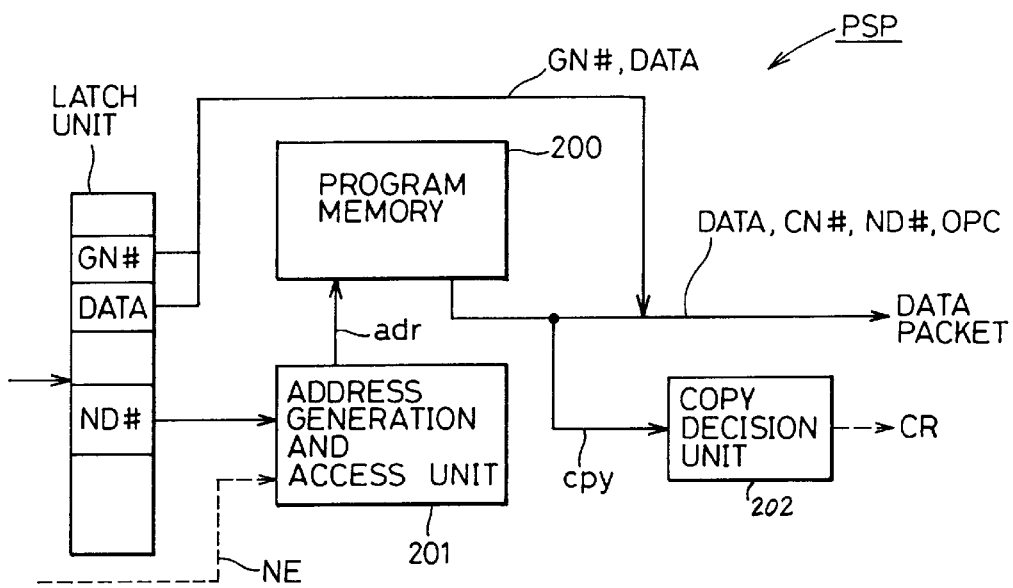
FIG. 28 is a block diagram showing a program storage unit PSP of FIG. 26.
Figure 29:
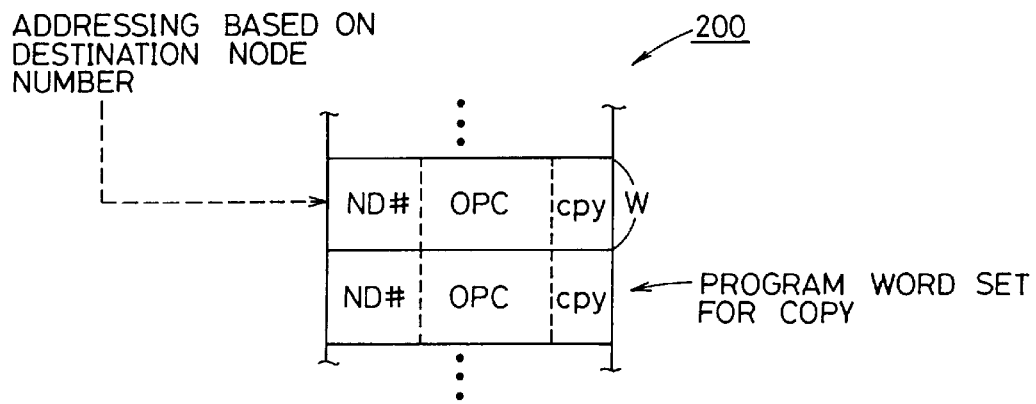
FIG. 29 is a diagram partially showing the contents of a program memory 200 of FIG. 28.

In addition, since a configuration of a data packet processed in this processor PE1 is similar to that of the data packet shown in FIG. 27, description thereof will not be repeated.

Figure 2:
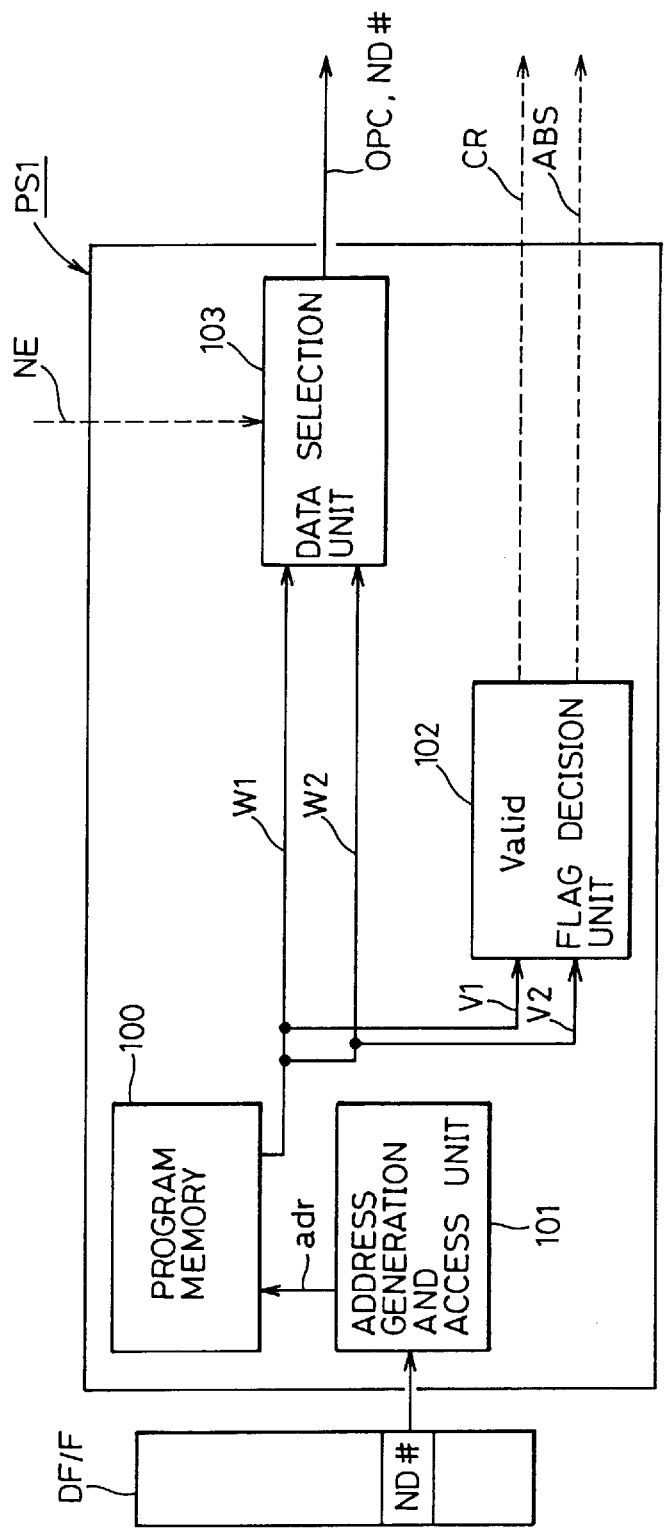
FIG. 2 is a block diagram showing a program storage unit PS1 of FIG. 1.

FIG. 2 is a block diagram showing program storage unit PS1 shown in FIG. 1.

Program storage unit PS1 includes a program memory 100, an address generation and access unit 101, a Valid flag decision unit 102, and a data selection unit 103.

FIG. 3 is a diagram partially showing the contents of program memory 100 of FIG. 2.

FIG. 4 is a table illustrating fetch operation of program storage unit PS1 of FIG. 1.

Referring to FIG. 3, since program memory 100 stores program word sets W1 and W2 in a field addressed based on a destination node number ND# of a data packet, the word sets W1 and W2 are read by single program data fetch operation by addressing.

Each of the program word sets W1 and W2 includes the subsequent destination node number ND# and the subsequent operation code OPC, and the program word sets W1 and W2 include Valid flags V1 and V2, respectively, each indicating whether information in the word set is valid (=1) or invalid (=0).

When program storage unit PS1 receives a data packet, address generation and access unit 101 generates an address adr from a destination node number ND# of the received data packet, and reads program word sets W1 and W2 from program memory 100 by addressing based on the address adr.

The read program word sets W1 and W2 are applied to data selection unit 103, and read Valid flags V1 and V2 are applied to Valid flag decision unit 102.

Data selection unit 103 and Valid flag decision unit 102 operates as follows according to the procedure shown in FIG. 4.

If the flags V1 and V2 applied to flag decision unit 102 are 0, flag decision unit 102 decides to erase a data packet, sets an erase signal ABS to 0 (=erase request), and applies the erase signal ABS to one input of gate G. At this time, a copy request signal CR is also 0 (copy unnecessary).

In addition, if either the flag V1 or V2 is 1, an erase signal ABS and a copy request signal CR are set to 1 and 0, respectively.

Furthermore, if both flags V1 and V2 are 1, both an erase signal ABS and a copy request signal CR are set to 1.

On the other hand, data selection unit 103 receives program word sets W1 and W2, and outputs only an operation code OPC and a destination node number ND# of a received program word set in which a Valid flag is 1. If both Valid flags of the received program word sets W1 and W2 are 1, data selection unit 103 first outputs a destination node number ND# and an operation code OPC of program word set W1, and further, outputs a destination node number ND# and an operation code OPC of program word set W2 after receiving a Next Enable signal NE from a corresponding C element Cn.

As described above, program storage unit PS1 enables conventional packet copy by one fetch operation (one addressing). Furthermore, when a packet erase signal ABS (=0) is output, data packet erasing can be performed in program storage unit PS1 using an operation code executed in operation unit FPP. This will now be described in conjunction with the drawings.

FIG. 5 is a diagram showing comparison between respective flow graphs of the first embodiment of the present invention and a conventional example for data packet erasing.

For example, in the case where an operation code Opr1 is executed to erase a data packet completely, an operation code ABSRB has been conventionally used (see (b) of FIG. 5). On the other hand, according to the first embodiment, since a data packet can be erased when operation code Opr1 is executed without using the operation code ABSRB (see (a) of FIG. 5), the number of instructions to be executed is reduced.

Second Embodiment

In the present embodiment, a data driven type processor allows alternative branch processing according to the decision whether the operation result of an operation unit is true or false, upon fetch of a program data in a program storage unit.

Figure 6:
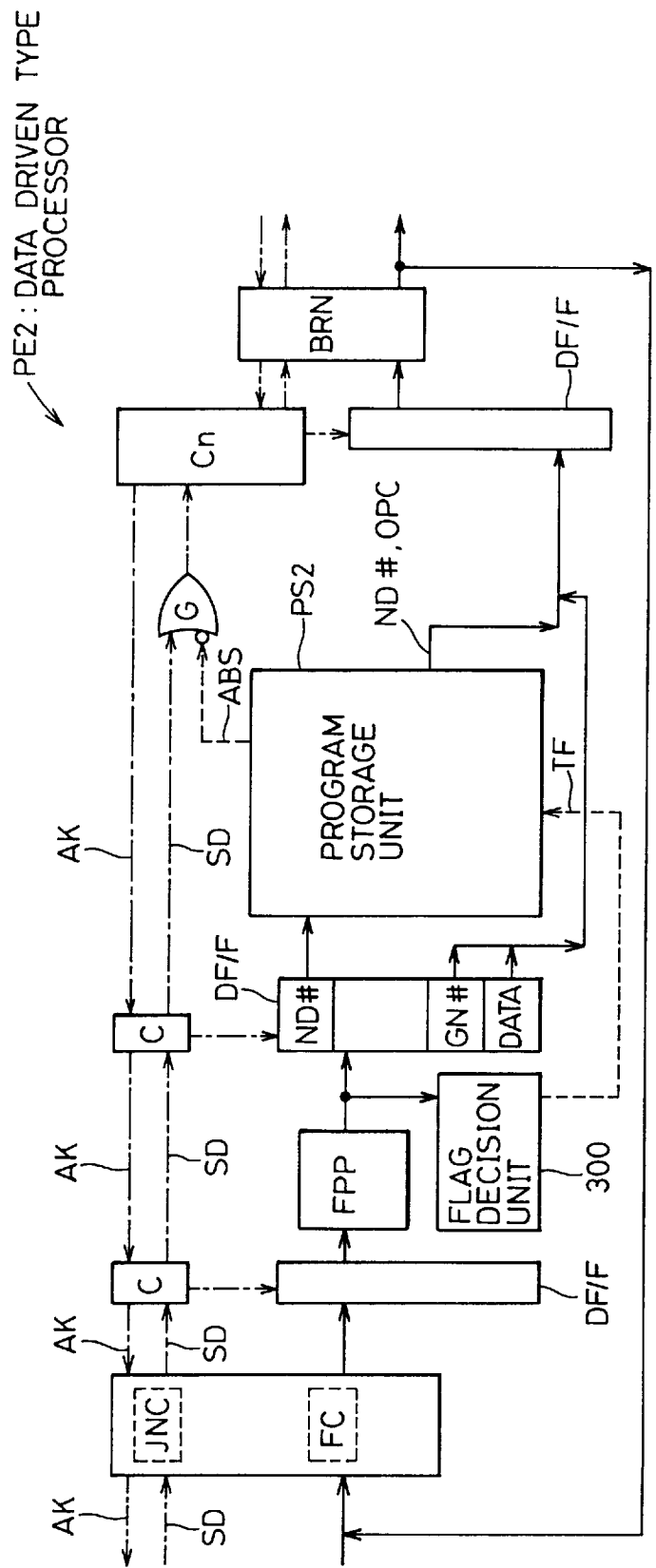
FIG. 6 is a block diagram showing a data driven type processor in accordance with a second embodiment of the present invention.

FIG. 6 is a block diagram showing a data driven type processor in accordance with the second embodiment of the present invention.

Instead of program storage unit PSP and the latch unit of the conventional processor Pe of FIG. 26, a processor PE2 of FIG. 6 has a program storage unit PS2 and a D type flipflop DF/F which functions similarly to the latch unit. Processor PE2 additionally includes a gate G and a flag decision unit 300 in an output stage of an operation unit FPP. Since the structure of processor PE2 is the same as that of the conventional processor Pe of FIG. 26 otherwise, description thereof will not be repeated.

Furthermore, since a configuration of a data packet processed in this processor PE2 is similar to that of the data packet shown in FIG. 27, description thereof will not be repeated.

Figure 7:
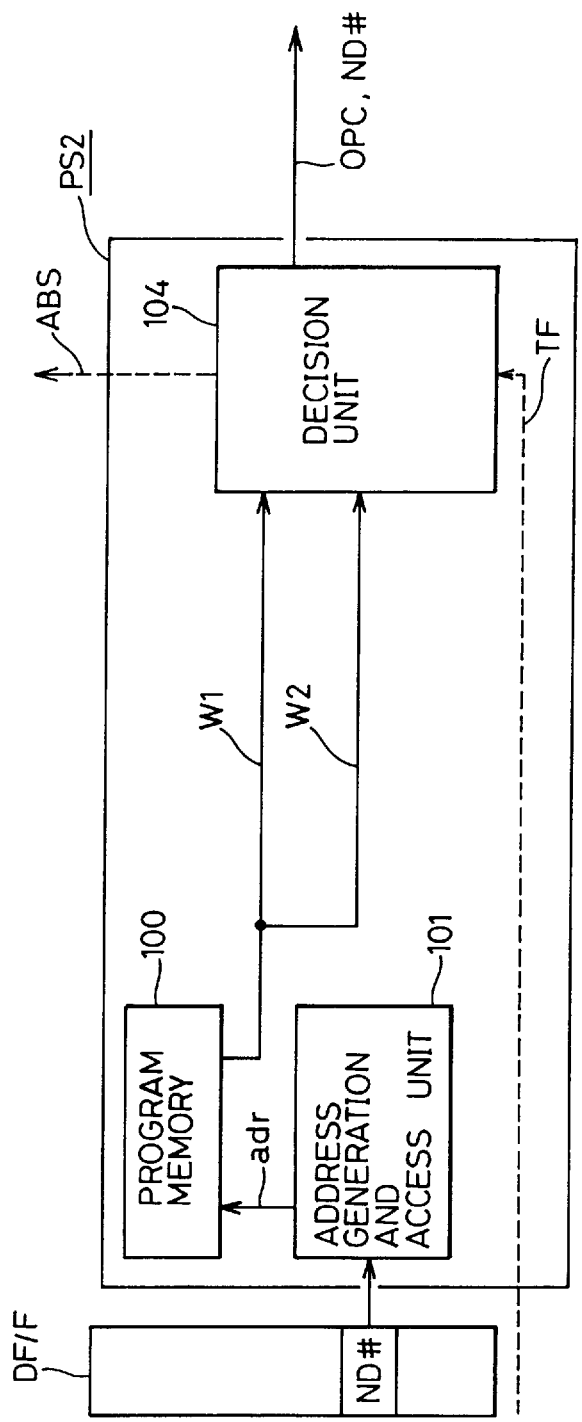
FIG. 7 is a block diagram showing a program storage unit PS2 of FIG. 6.

FIG. 7 is a block diagram showing program storage unit PS2 of FIG. 6.

Program storage unit PS2 includes a program memory 100, an address generation and access unit 101, and a decision unit 104. Since program memory 100 and address generation and access unit 101 are the same as those shown in FIG. 2, description thereof will not be repeated.

Figures 8, 9:
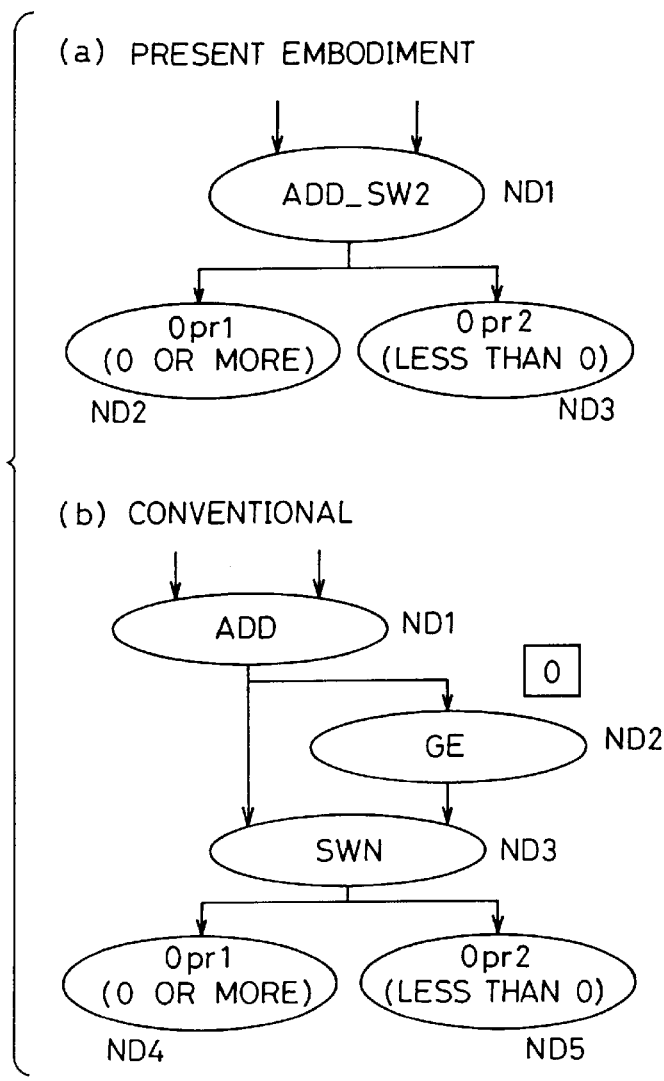
FIG. 8 is a table illustrating fetch operation of the program storage unit PS2 of FIG. 6.
FIG. 9 is a diagram showing comparison between flow graphs of the second embodiment of the present invention and a conventional example for branch according to the decision whether the result of operation is true or false.

FIG. 8 is a table illustrating fetch operation of program storage unit PS2 of FIG. 6.

Referring to FIG. 6, operation unit FPP performs operation in a manner similar to that of the conventional example, and outputs a data packet which stores the resultant data to program storage unit PS2. At this time, whether the operation result for each operation code OPC executed in operation unit FPP is true or false is decided in flag decision unit 300, and a true/false flag TF is output to program storage unit PS2.

Decision unit 104 of program storage unit PS2 receives program word sets W1 and W2 read from memory 100, and a true/false flag TF. Decision unit 104 refers to the true/false flag TF, selects a preset program word set of a true node, for example, a program word set W1 if the true/false flag TF is 1, and selects a preset program word set of a false node, for example, a program word set W2 if the true/false flag TF is 0.

Furthermore, the decision whether the program word set selected by the true/false flag TF is valid or not is made by a corresponding Valid flag and a destination node number ND# and an operation code OPC of the selected program word set are output only when the selected program word set is valid.

The above described fetch operation of program storage unit PS2 is shown in FIG. 8.

In data driven type processor PE2, a program can be controlled according to setting of a Valid flag in program memory 100. More specifically, whenever Valid flags of true and false nodes are set to 0, a data packet is always erased.

In addition, if Valid flags of a true node and a false node are set to 0 and 1, respectively, a program is executed only when false conditions are satisfied, and a data packet is erased when true conditions are satisfied. More specifically, a False Gate which can output the data packet only if false conditions are satisfied can be realized.

Similarly, if Valid flags of both true and false nodes are set to 1, selection is carried out according to the decision whether the operation result is true or false, that is, conditional branch is carried out.

It is noted that since packet copy is impossible in this program storage unit, neither a Next Enable signal NE transferred from a C element is used nor a copy request signal CR is output.

Thus, an operation instruction and a branch instruction according to the operation result can be executed with a single instruction in the data driven type processor PE2. This will now be described in conjunction with the drawing.

FIG. 9 is a diagram showing comparison between respective flow graphs of the second embodiment of the present invention and a conventional example for branch carried out according to the decision whether the operation result is true or false.

Conventionally, a plurality of instructions have been required when a branch to either an operation code Opr1 or Opr2 is caused by the operation result of an operation code ADD of a node ND1, for example (see (b) of FIG. 9). On the other hand, according to the second embodiment, an operation code ADD_SW2 enables both addition processing in operation unit FPP and branch processing in program storage unit PS2 according to the addition result to be carried out with a single instruction (see (a) of FIG. 9), whereby the number of instructions to be executed is reduced.

Third Embodiment

In the present embodiment, a data driven type processor is shown which allows branch processing in which one program data is selected from n (where n>2) program data according to an operation result when program data is fetched in a program storage unit.

Figure 10:
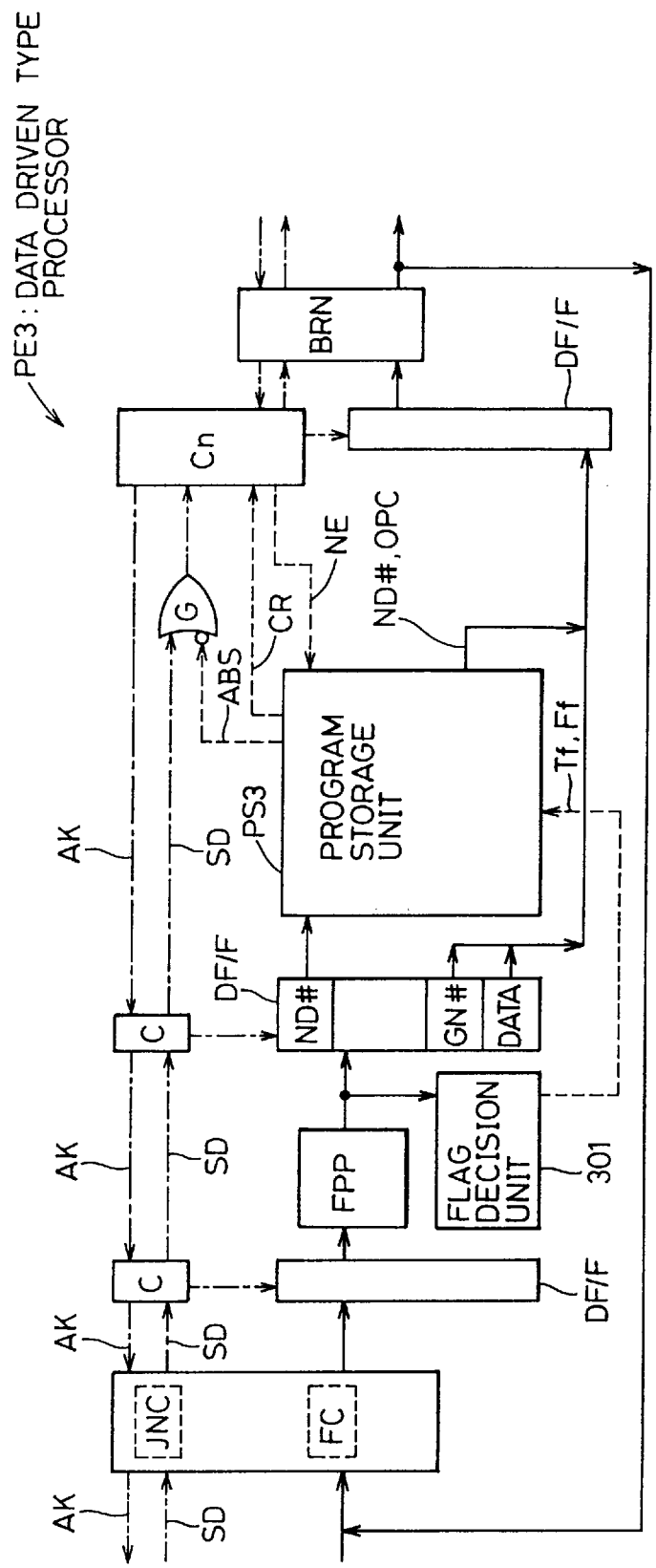
FIG. 10 is a block diagram showing a data driven type processor in accordance with a third embodiment of the present invention.

FIG. 10 is a block diagram showing a data driven type processor in accordance with the third embodiment of the present invention.

Instead of program storage unit PSP and the latch unit in the conventional processor Pe of FIG. 26, a processor PE3 of FIG. 10 has a program storage unit PS3 and a D type flipflop DF/F which functions similarly to the latch unit. Processor PE3 additionally includes a gate G and a flag decision unit 301 in an output stage of an operation unit FPP. Since the structure of processor PE3 is the same as that of the conventional processor Pe of FIG. 26 otherwise, description thereof will not be repeated.

In addition, since a configuration of a data packet processed in this processor PE3 is similar to that of the data packet shown in FIG. 27, description thereof will not be repeated.

Figure 11:
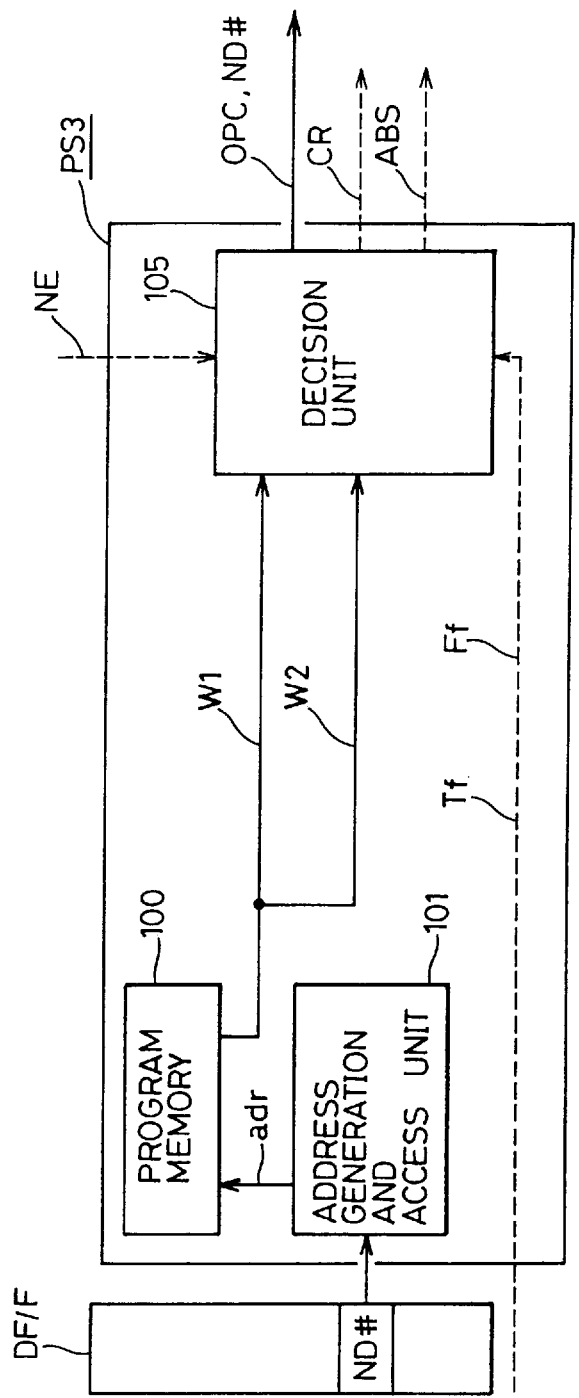
FIG. 11 is a block diagram showing a program storage unit PS3 of FIG. 10.

FIG. 11 is a block diagram showing program storage unit PS3 of FIG. 10.

Program storage unit PS3 includes a program memory 100, an address generation and access unit 101, and a decision unit 105. Since program memory 100 and address generation and access unit 101 are the same as those shown in FIG. 2, description thereof will not be repeated.

FIG. 12 a table illustrating fetch operation of program storage unit PS3 of FIG. 11.

Referring to FIG. 10, operation unit FPP performs operation in a manner similar to that of a conventional example, and outputs a data packet which stores the operation resultant data to program storage unit PS3. At this time, flag decision unit 301 receives the operation resultant value and an operation code OPC, decides whether the operation result for each operation code OPC is true or false, and outputs to program storage unit PS3 the number of flags (a true flag Tf and a false flag Ff in this case) corresponding to the number of program word sets read from the program memory by addressing.

A true flag Tf indicates whether conditions of a true node (for example, a program word set W1) are satisfied or not, and similarly, the false flag Ff indicates whether conditions of false node (for example, a program word set W2) are satisfied or not.

In addition, whether a program word set whose conditions are considered to be satisfied by a flag Tf or Ff is valid or not is decided by a corresponding Valid flag, and a destination node number ND# and an operation code OPC of that program word set are output only if it is valid.

The above described fetch operation of program storage unit PS3 is shown in FIG. 12. As shown in the figure, branch processing, copy processing and packet erasing can be carried out according to the operation result.

Although a branch to one of two nodes according to the operation result is caused in the above described processor PE3 of FIG. 10, a branch to one of three nodes may be carried out.

Figure 13:
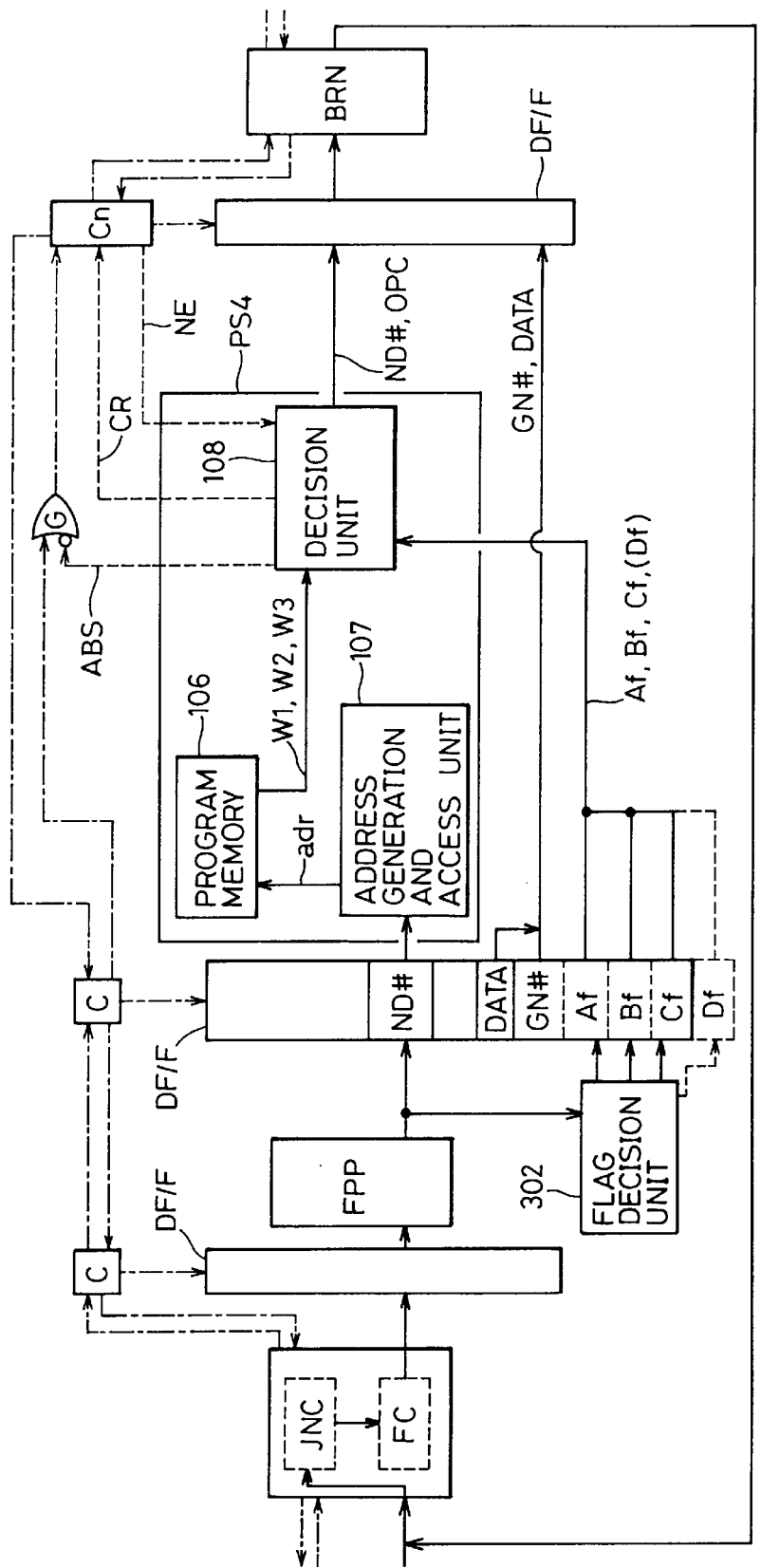
FIG. 13 is a block diagram showing an improvement of the processor PE3 of FIG. 10.

FIG. 13 is a block diagram showing an improvement of processor PE3 of FIG. 10.

Instead of program storage unit PS3 and flag decision unit 301 of processor PE3 shown in FIG. 10, a data driven type processor PE4 shown in FIG. 13 has a program storage unit PS4 and a flag decision unit 302. The structure of the data driven type processor PE4 shown in FIG. 13 is similar to that of the processor PE3 shown in FIG. 10 otherwise.

When an operation unit FPP outputs the operation result, flag decision unit 302 receives that operation result and an operation code OPC, and outputs an A flag Af, a B flag Bf and a C flag Cf with one of which set to 1 according to the operation result based on the operation code OPC.

Program storage unit PS4 includes a program memory 106, an address generation and access unit 107, and a decision unit 108.

FIG. 14 is a flow graph illustrating branch processing according to the operation result in processor PE4 of FIG. 13.

An operation code ADD_SW3 in the flow graph of FIG. 14 indicates that right input data and left input data to a node to which the operation code is assigned are added, and further, a flag Af=1 is selected if the resultant value is negative, a flag Bf=1 is selected if positive, and a flag Cf=1 is selected if 0.

FIG. 15 is a diagram showing the contents of program memory 106 of FIG. 13 for the flow graph of FIG. 14.

FIG. 16 is a table showing correspondence between the result of operation according to an operation code ADD_SW3 and flag output.

Processing according to the flow graph of FIG. 14 will now be described.

When operation according to an operation code ADD_SW3 in a node ND1 of FIG. 14 is performed in operation unit FPP, the operation result and the operation code ADD_SW3 are applied to flag decision unit 302. Furthermore, a data packet which stores the resultant value of the operation is applied to program storage unit PS4.

Flag decision unit 302 decides the operation result based on the applied operation code ADD_SW3, sets flags Af, Bf and Cf, and outputs these flags to program storage unit PS4. Correspondence between the operation result and the flag output is as shown in FIG. 16.

Address generation and access unit 107 of program storage unit PS4 addresses program memory 106 based on an address adr obtained from a destination node number ND# of the data packet which stores the operation resultant value, reads program word sets W1, W2 and W3 shown in FIG. 15, and applies these program word sets to decision unit 108.

Since all the Valid flags V1–V3 of the applied three program word sets W1–W3 are "1" (valid), decision unit 108 selects every program word set which corresponds to a flag set to "1" among flags Af, Bf and Cf.

It is noted that only a flag Af is 1 if the operation result is negative, only a flag Bf is 1 if positive, and only a flag Cf is 1 if 0, and other two flags are 0 in each case.

Accordingly, the program word set W1 corresponding to the flag Af, that is, an operation code Opr0 (a node ND2) is selectively fetched if the operation result is negative, the program word set W2 corresponding to the flag Bf, that is, an operation code Opr1 (a node ND3) is selectively fetched if positive, and the program word set W3 corresponding to the flag Cf, that is, an operation code Opr2 (a node ND4) is selectively fetched if 0.

It is noted that an erase signal ABS and a copy request signal CR are held to be 1 and 0, respectively, since packet erasing and packet copy will not occur.

With the above described processor PE3 or PE4, only provision of the same number of flags as that of program word sets in a single addressed region of the program memory enables multi-branch processing of at least two branches according to the operation result to be carried out at the time of reading a program, in addition to copy processing and packet erasing.

Figure 30:
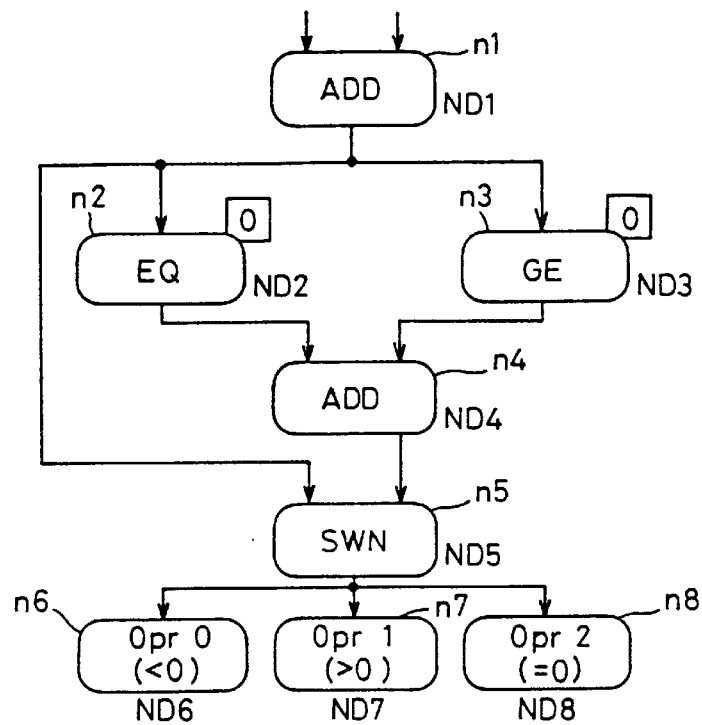
FIG. 30 is a conventional flow graph including a selection structure using an operation code SWN.
Figure 31:
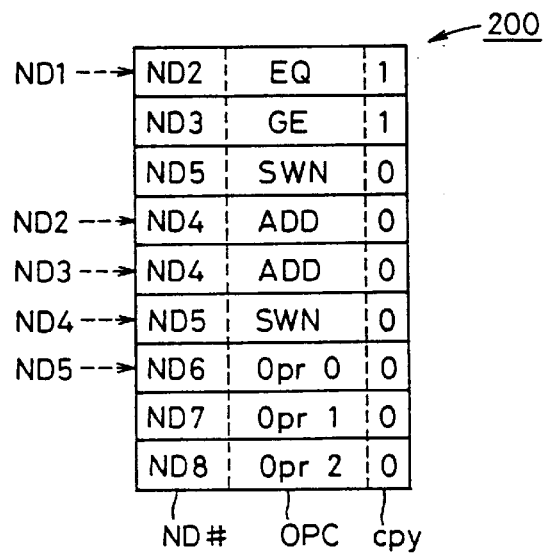
FIG. 31 is a diagram showing the contents of the program memory 200 for the data flow graph of FIG. 30.

It can be seen from comparison between flow graphs for branch processing according to the operation result shown in FIGS. 14 and 30 that the number of instructions at the time of carrying out processing is significantly reduced in the present embodiment.

FIG. 17 is a flow graph including packet copy in branch processing in accordance with the third embodiment of the present invention.

An operation code ADD_SW4 in the figure indicates that right input data and left input data to a node to which the operation code is assigned are added, and further, flags Af and Bf=1 are selected if the resultant value is negative, a flag Cf=1 selected if positive, and a flag Df=1 is selected if 0.

In the flow graph of FIG. 17, the operation code ADD_SW4 is substituted for the operation code ADD_SW3 in the flow graph of FIG. 14, and packet copy for operation codes Opr0 and Opr4 is carried out in the branch to negative (<0). Accordingly, one output is additionally provided in flag decision unit 302 of the data driven type processor of FIG. 13, so that the flipflop DF/F in the output stage of operation unit FPP holds a flag Df in addition to the flags Af, Bf and Cf.

Figure 18:
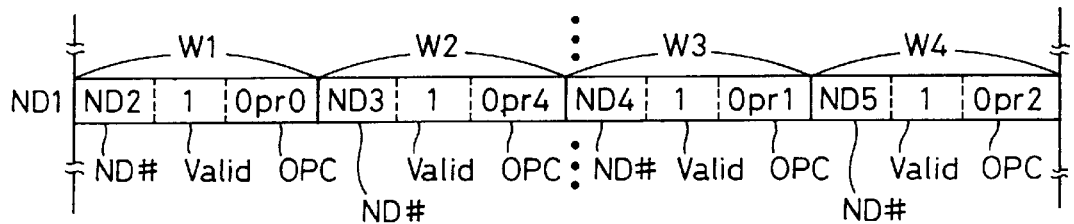
FIG. 18 is a diagram showing the contents of a program memory for the flow graph of FIG. 17.

FIG. 18 is a diagram showing the contents of the program memory for the flow graph of FIG. 17. In FIG. 18, a single addressed region of program memory has program word sets W1–W4 corresponding to flags Af–Df.

Fourth Embodiment

In the present embodiment, a program storage unit is provided in an input stage of a processing apparatus including at least one data driven type processor, whereby packet copy, packet erasing and branch processing by the program storage unit described in the first to the third embodiments are carried out before data is input to each processor.

Figure 19:
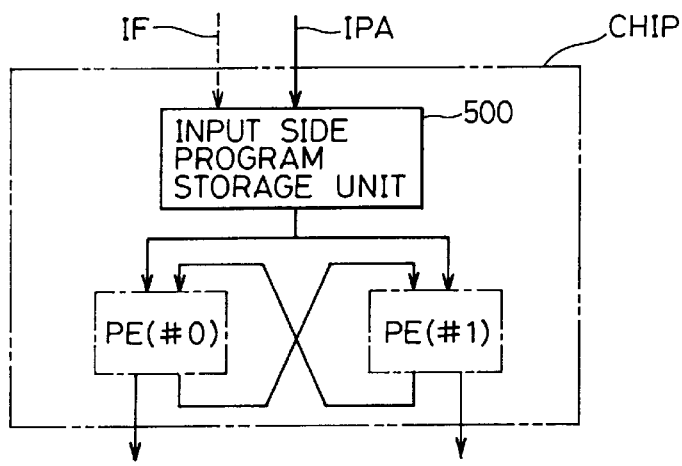
FIG. 19 is a block diagram showing a processing apparatus (chip) in accordance with a fourth embodiment of the present invention.

FIG. 19 is a block diagram showing the processing apparatus in accordance with the fourth embodiment of the present invention. The apparatus (chip) of FIG. 19 includes a program storage unit 500 located on the side of the input of the apparatus (hereinafter referred to as input side program storage unit), and two data driven type processors PE (#0) and PE (#1).

Although two data driven type processors are provided in the chip in the present embodiment, the number of data driven type processors to be provided is not limited to this so long as at least one data driven type processor is provided.

Figure 20:
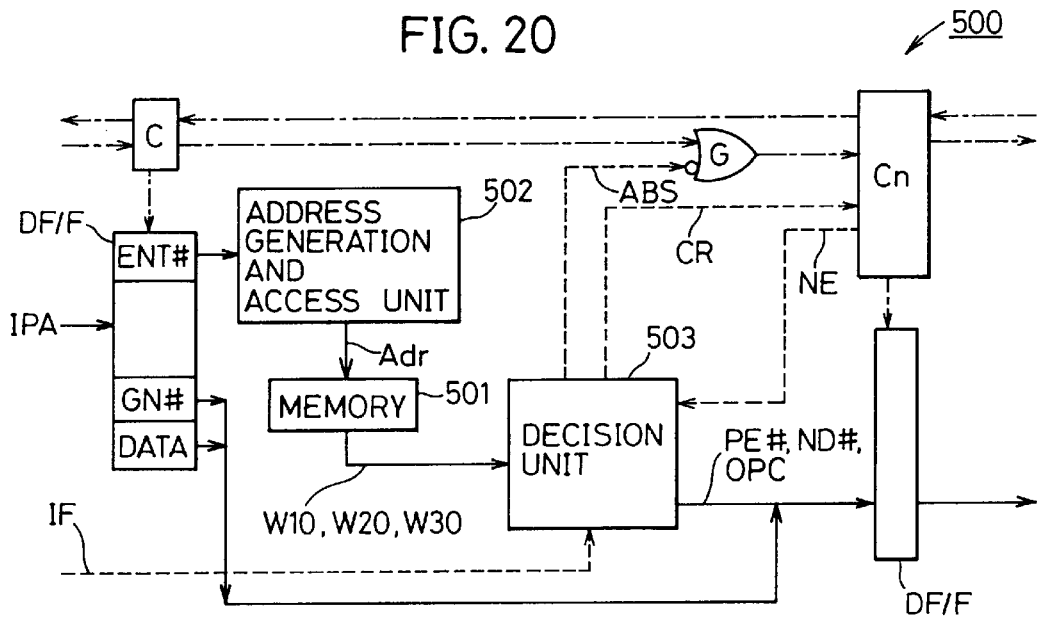
FIG. 20 is a block diagram showing a program storage unit 500 located on the side of input of the apparatus shown in FIG. 19.

FIG. 20 is a block diagram showing input side program storage unit 500 of FIG. 19. Input side program storage unit 500 includes a flipflop DF/F and a C element for controlling the flipflop in an input stage thereof, and further includes a flipflop DF/F and a Cn element for controlling the flipflop in an output stage thereof. Storage unit 500 further includes a memory 501, an address generation and access unit 502, a decision unit 503, and a gate G.

Figure 21:
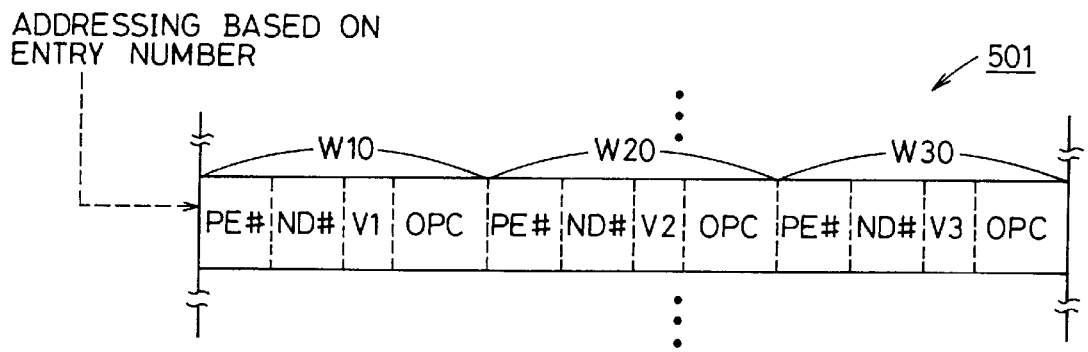
FIG. 21 is a diagram partially showing the contents of a memory of FIG. 20.
Figure 22:
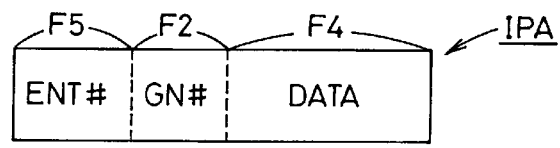
FIG. 22 is a diagram showing a configuration of an input data packet IPA to the chip of FIG. 19.

FIG. 21 is a diagram partially showing the contents of memory 501 of FIG. 20, and FIG. 22 is a diagram showing a configuration of a data packet IPA applied to the chip of FIG. 19.

Referring to FIG. 22, the applied data packet IPA is formed of an entry number field F5 for storing an entry number ENT#, a generation number field F2 for storing a generation number GN#, and a data field F4 for storing data DATA.

Memory 501 includes program word sets W10, W20 and W30 in a region addressed based on an entry number ENT# of the applied data packet IPA. Each program word set includes a processor number PE#, a destination node number ND#, a Valid flag, and an operation code OPC.

When the data packet IPA is applied to the chip, flag information IF is also applied thereto. The flag information IF includes the above described flags TF, Tf, Ff, Af, Bf, Cf, Df and the like.

Address generation and access unit 502 reads program word sets W10, W20 and W30 from memory 501 by addressing based on an address Adr obtained from the entry number ENT# of the applied data packet IPA, and applies these read program word sets to decision unit 503.

Decision unit 503 outputs a signal ABS or CR according to the contents of the applied word sets W10, W20 and W30 and the applied flag information IF. Thus, the above described processings such as packet copy, packet erasing, branch and the like are performed in input side program storage unit 500, and the resultant data packet is output to a processor corresponding to a processor number PE# thereof.

Figure 23:
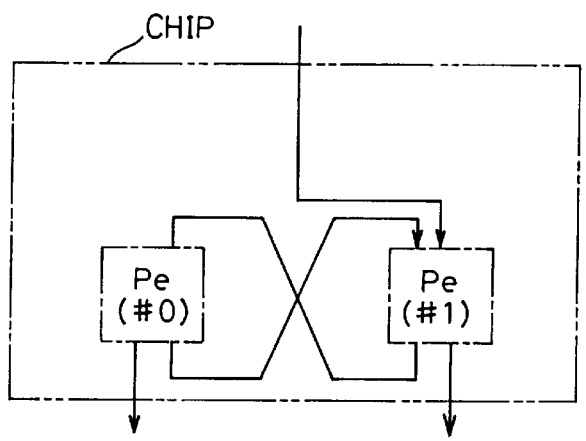
FIG. 23 is a block diagram showing a conventional processing apparatus (chip) including at least one data driven type processor.
Figure 24:
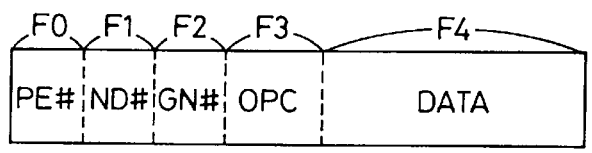
FIG. 24 is a diagram showing a configuration of an input data packet to the chip of FIG. 23.

FIG. 23 is a block diagram showing a conventional processing apparatus (chip) including at least one data driven type processor, and FIG. 24 is a diagram showing a configuration of a data packet applied to the chip of FIG. 23.

The applied data packet of FIG. 24 includes a processor number field F0 for storing a destination processor number PE#, a field F1 for storing a destination node number ND#, a field F2 for storing a generation number GN#, a field F3 for storing an operation code OPC, and a field F4 for storing data DATA.

If the chip of FIG. 23 is compared to that of FIG. 19, in the case where packet copy is carried out at the beginning of a program, excess data packets are circulated as described above in the data driven type processor in the conventional chip of FIG. 23, so that improvement in program execution efficiency is prevented, while packet copy is carried out in input side program storage unit 500 in the input stage of the chip of FIG. 19 and excess data packets will not be circulated in the data driven type processor in the chip, so that program execution efficiency is improved.

Figure 25:
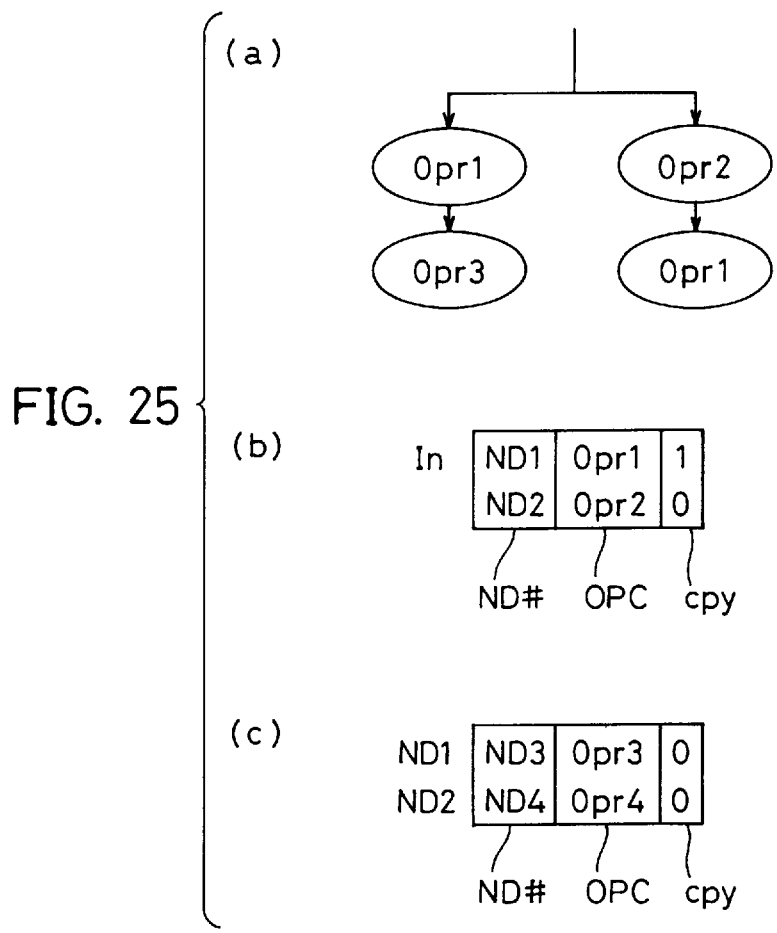
FIG. 25 is a diagram illustrating processing procedure in the case where packet copy is carried out at the beginning of a program in accordance with the fourth embodiment of the present invention.

FIG. 25 is a diagram illustrating processing procedure in the case where packet copy is carried out at the beginning of a program in accordance with the fourth embodiment of the present invention.

More specifically, (a) of FIG. 25 is a flow graph showing this processing procedure, (b) of FIG. 25 shows the contents of memory 501 of input side program storage unit 500 for this flow graph, and (c) of FIG. 25 shows the contents of a program memory of a processor in the chip for this flow graph.

It can be seen from comparison between (a)–(c) of FIG. 25 and (a)–(c) of FIG. 33 that the number of instructions to be executed is reduced in the present embodiment.

In addition to the case of packet copy, when processing such as packet erasing or branch is carried out at the beginning of a program, the processing is performed in input side program storage unit 500 which serves as a common inlet for each processor in the chip, whereby improvement in program execution efficiency and reduction in the number of instructions to be executed can be achieved.

Furthermore, allocation of input pins to the chip of the present embodiment is shown in FIG. 22, and allocation of input pins to the conventional chip is shown in FIG. 24.

When allocation of input pins to the chip in the present embodiment is compared to that in the conventional example with reference to FIGS. 22 and 24, a generation number field F2 and a data field F4 are common to both the present embodiment and the conventional example, while an entry number field F5 is substituted in the present embodiment for a processor number-field F0, a destination node number field F1 and an operation code field F3 of the conventional example. More specifically, the number of bits of input pins to the chip is compressed compared to the case of the conventional example, so that reduction in the number of input pins can be achieved.

It is noted that a data driven type processor constituting the chip of the present embodiment may be the processor in each of the first to the third embodiments described above, or may be a conventional processor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processor, comprising:
a processing unit including at least one information processor; and
a data supply unit, wherein
(a) each of said information processors includes
(a-1) data pair generating means for (i) receiving a data packet including at least a destination field for storing destination information, an instruction field for storing instruction information, and a data field for storing data, (ii-a) outputting the received data packet directly as a first data packet if said instruction information of said instruction field of the received data packet is not a prescribed instruction information, and (ii-b-1) additionally storing a content of said data field of the received data packet, which is one of two different received data packets having the same destination information in respective destination fields, in a data field of the other received data packet of the two different received data packets if said instruction information of said instruction field of the received data packet is said prescribed instruction information and (ii-b-2) outputting the other received data packet having additionally stored content as the first data packet,
(a-2) operation means for (i) receiving the first data packet, (ii) performing a prescribed operation on a content of a data field of the first data packet according to instruction information of an instruction field of the first data packet, (iii) storing a result of the operation in a data field of the first data packet to provide a second data packet, and (iv) outputting the second data packet,
(a-3) program storage means for (i) receiving the second data packet from said operation means, (ii) reading at least one first subsequent destination information and at least one first subsequent instruction information from a prestored first data flow program by first addressing based on a content of a destination field of the second data packet, (iii) generating at least one data packet which stores the read first destination information and the read first instruction information in a destination field and an instruction field thereof, respectively, and stores a content of a data field of the second data packet in the data field thereof, and (iv) outputting said at least one data packet,
(b) said data supply unit is provided in an input stage of said processing unit, and
(i) receives a third data packet formed of at least a destination field and a data field, (ii-a-1) reads at least one second subsequent destination information and at least one second subsequent instruction information from a prestored second data flow program by second addressing based on a content of the destination field of the third data packet, (ii-a-2) generates at least one fourth data packet which stores the read second destination information and the read second instruction information in a destination field and an instruction field thereof, respectively, and stores a content of the data field of the third data packet in the data field thereof, and (ii-a-3) selectively supplies said at least one fourth data packet to said data pair generating means or (ii-b) erases the third data packet.

2. The data driven type information processor in accordance with claim 1, wherein said second data flow program is formed of at least one second information set including said at least one second subsequent destination information and said at least one second subsequent instruction information in a same program word, and said data supply unit (i) reads said program word from said second data flow program by said second addressing, (ii) generates the at least one fourth data packet corresponding to each of said at least one second information set selected from said program word according to a second prescribed condition, (iii) stores said at least one second subsequent destination information and said at least one second subsequent instruction information of corresponding selected ones of said at lest one second information set in a destination field and an instruction field of each generated at least one fourth data packet, respectively, and stores the content of said data field of the third data packet in a data field of each generated data packet, and (iv) supplies each generated data packet to said data pair generating means as the at least one fourth data packet.

3. The data driven type information processors in accordance with claim 2, wherein said at least one second information set further includes second valid/invalid information indicating whether corresponding ones of said at least one second subsequent destination information and corresponding ones of said at least one second subsequent instruction information are valid or invalid, and said second prescribed condition is a condition for selecting only a second information set in which said second valid/invalid information is valid from said program word read by said second addressing.

4. The data driven type information processor in accordance with claim 3, wherein said data supply unit further receives a branch code for branch processing at the time of receiving the third data packet, and said second prescribed condition is a condition for selecting only predetermined ones of said at least one second information set which corresponds to a value of said branch code and in which corresponding second valid/invalid information is valid from said program word read by said second addressing.

5. The data driven type information processor in accordance with claim 4, wherein said branch code is formed of at least one flag, and a number of flags corresponds to a number of said at least one second information set in said program word read by said second addressing.

6. The data driven type information processor in accordance with claim 5, wherein said first data flow program is formed of at least one first information set including said at least one first subsequent destination information and said at least one first subsequent instruction information in a same program word, and said program storage means (i-a-1) reads said program word from said first data flow program by said first addressing, (i-a-2) generates the at least one data packet corresponding to each of said at least one first information set selected from said program word according a first prescribed condition, (i-a-3) stores said at least one first subsequent destination information and said at least one first subsequent instruction information of corresponding selected ones of said at least one first information set in a destination field and an instruction field of each generated at least one data packet, respectively, and stores the content of said data field of the second data packet in a data field of each generated data packet and selectively (i-a-4) outputs each generated data packet as the at least one data packet, or (i-b) erases the second data packet.

7. The data driven type information processor in accordance with claim 6, wherein said at least one first information set further includes first valid/invalid information indicating whether corresponding ones of said at least one first subsequent destination information and corresponding ones of said at least one first subsequent instruction information are valid or invalid, said first prescribed condition is a condition for selecting only a first information set in which said first valid/invalid information is valid from said program word read by said first addressing.

8. The data driven type information processor in accordance with claim 7, wherein said operation means includes means for outputting a condition code indicating a result of said prescribed operation when outputting the second data packet which stores the result of said prescribed operation, and said first prescribed condition is a condition for selecting only predetermined ones of said at least one first information set which correspond to a value of said condition code and in which corresponding first valid/invalid information is valid from said program word read by said first addressing.

9. The data drive type information processor in accordance with claim 8, wherein said condition code is formed of at least one flag, and a number of flags corresponds to a number of said at least one first information set in said program word read by said first addressing.

10. The data driven type information processor in accordance with claim 1, wherein said first data flow program is formed of at least one first information set including said at least one first subsequent destination information and said at least one first subsequent instruction information in a same program word, and said program storage means (i-a-1) reads said program word from said first data flow program by said first addressing, (i-a2) generates the at least one data packet corresponding to each of said at least one first information set selected from said program word according to a first prescribed condition, (i-a-3) stores said at least one first subsequent destination information and said at least one first subsequent instruction information of corresponding selected ones of said at least one first information set in a destination field and an instruction field of each generated at least one data packet, respectively, and stores the content of said data field of the second data packet in a data field of each generated data packet and (i-a-4) selectively outputs each generated data packet as the at least one data packet, or (i-b) erases the second data packet.

11. The data driven type information processor in accordance with claim 10, wherein
said at least one first information set further includes first valid/invalid information indicating whether corresponding ones of said at least one first subsequent destination information and corresponding ones of said at least one first subsequent instruction information are valid or invalid, and
said first prescribed condition is a condition for selecting only a first information set in which said first valid/invalid information is valid from said program word read by said first addressing.

12. The data driven type information processor in accordance with claim 11, wherein
said operation means includes means for outputting a condition code indicating a result of said prescribed operation to said program storage means when outputting the second data packet which stores the result of said prescribed operation, and
said first prescribed condition is a condition for selecting only predetermined ones of said at least one first information set which correspond to a value of said condition code and in which corresponding first valid/invalid information is valid from said program word read by said first addressing.

13. The data driven type information processor in accordance with claim 12, wherein
said condition code is formed of at least one flag, and a number of flags corresponds to a number of said at least one first information set in said program word read by said first addressing.

14. A data driven type information processor, comprising:
data pair generating means for (i) receiving a data packet including at least a destination field for storing destination information, an instruction field for storing instruction information, and a data field for storing data, (ii-a) outputting the received data packet directly as a first data packet if said instruction information of said instruction field of the received data packet is not a prescribed instruction information, and (ii-b-1) additionally storing a content of said data field of the received data packet, which is one of two different received data packets having the same destination information in respective destination fields, in a data field of the other received data packet of the two different received data packets if said instruction information of said instruction field of the received data packet is said prescribed instruction information and (ii-b-2) outputting the other received data packet having additionally stored content as the first data packet;
operation means for (i) receiving the first data packet, (ii) performing a prescribed operation on a content of a data field of the first data packet according to instruction information in an instruction field of the first data packet, (iii) storing a result of said prescribed operation in a data field of the first data packet to provide a second data packet, and (iv) outputting the second data packet; and
program storage means for (i) prestoring a data flow program formed of at least one information set including, in a same program word, subsequent destination information, subsequent instruction information and valid/invalid information indicating whether said subsequent destination information and said subsequent instruction information are valid or invalid, (ii) receiving the second data packet, (iii) reading a program word from said data flow program by addressing based on a content of a destination field of the second data packet, and (iv-a) outputting no data packet if every valid/invalid information in the read program word is invalid, or (iv-b-1) generating third data packets corresponding to said at least one information set in the read program word, in which the valid/invalid information is valid, (iv-b-2) storing said subsequent destination information and said subsequent instruction information of a corresponding one of said at least one information set in a destination field and an instruction field of each generated third data packet, respectively, and storing a content of a data field of the second data packet in a data field of each generated third data packet and (iv-b-3) outputting each generated third data packet.

15. The data driven type information processor in accordance with claim 14, wherein
said operation means includes means for outputting a condition code indicating a result of said prescribed operation to said program storage means when outputting the second data packet which stores the result of said prescribed operation, and
said program storage means receives said condition code, and generates a third data packet only for predetermined ones of said at least one information set in said program word read by said addressing which correspond to a value of the received condition code and in which said valid/invalid information is valid.

16. The data driven type information processor in accordance with claim 15, wherein
said condition code is formed of at lest one flag, and a number of flags corresponds to a number of said at least one information set in said program word read by said addressing.

17. A data driven type information processor comprising:
data pair generating means for matching received first data packets in accordance with destination information and instruction information stored within the received first data packets and selectively outputting a received first data packet which has not been matched or a new data packet including destination information, instruction information and data of matching received first data packets stored therein as a second data packet;
operation means, coupled to said data pair generating means, for receiving the second data packet, performing an operation on data stored in the second data packet in accordance with an instruction information of the second data packet, storing the operation result in the second data packet and outputting the second data packet having the operation result stored therein as a third data packet; and
program storage means, coupled to said operation means, for a) prestoring a data flow program having plural program words at each address, each program word including subsequent destination information, subsequent instruction information and valid/invalid information, b) receiving the third data packet, c) reading program words based on the destination information of the third data packet, d) generating output data packets each respectively including destination information and instruction information of the read program words and data stored in the third data packet if the valid/invalid information of the read program words are valid, and e) generating no output data packets if the valid/invalid information of the read program words are invalid.

18. The data driven type information processor of claim 17, further comprising:

data supply means, coupled to said data pair generating means, for a) prestoring a second data flow program having plural second program words each including second destination information and second instruction information, b) receiving a data packet, c) reading a second program word based on a destination information of the received data packet, d) generating a fourth data packet as including the second destination information and the second instruction information of the read program word and data stored in the received data packet, and e) selectively outputting the fourth data packet to said data pair generating means as a first data packet or erasing the received data packet.

* * * * *